(12) United States Patent
Liu et al.

(10) Patent No.: US 11,594,245 B1
(45) Date of Patent: Feb. 28, 2023

(54) BIFUNCTIONAL TURNTABLE

(71) Applicant: HANPIN ELECTRON CO., LTD., Tainan (TW)

(72) Inventors: Shen-Keng Liu, Tainan (TW); Chang-Hsiou Lu, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 10 days.

(21) Appl. No.: 17/460,505

(22) Filed: Aug. 30, 2021

(51) Int. Cl.
*G11B 3/60* (2006.01)
*G06F 3/16* (2006.01)

(52) U.S. Cl.
CPC ............. *G11B 3/60* (2013.01); *G06F 3/165* (2013.01)

(58) Field of Classification Search
CPC ..................... G09G 3/32; G09G 2330/028
See application file for complete search history.

(56) References Cited

U.S. PATENT DOCUMENTS

| | | | |
|---|---|---|---|
| 2010/0020673 A1* | 1/2010 | Flum | G11B 27/007 369/264 |
| 2019/0279679 A1* | 9/2019 | Riley | G11B 3/48 |

* cited by examiner

*Primary Examiner* — Andrew Sasinowski
(74) *Attorney, Agent, or Firm* — Rosenberg, Klein & Lee

(57) ABSTRACT

A bifunctional turntable which includes a rotating shaft, a platter, a light sensor module, an audio control module, and a plinth is revealed. The rotating shaft which is driven by a power source to rotate drives the platter to rotate. Then the light sensor module disposed on the rotating shaft detects rotation speed of the platter for playing a record at normal speed. The audio control module is located in the plinth and disposed on a simulated record for detecting changes in the simulated record which is manually operated. Then the audio control module sends signals to a digital audio control system at a rear end for driving the digital audio control system to output audio signals. Thereby the present turntable plays not only vinyl records but also simulated records.

6 Claims, 5 Drawing Sheets

BIFUNCTIONAL TURNTABLE

BACKGROUND OF THE INVENTION

Field of the Invention

The present invention relates to a bifunctional turntable, especially to a bifunctional turntable which plays not only vinyl records but also simulated records for audio mixing or effect.

Description of Related Art

The rise of fast fashion makes people learn more about permanent values of classic items such as vinyl records. Vinyl records make a comeback after decades of being behind CDs due to high-resolution audio. A stylus is moved and vibrated in a groove of the vinyl record and audio signals are sensed by two coils on two side of the groove. The vibrations of the stylus are sent to a cartridge through a cantilever and magnetic intensity is converted into electrical signals and finally current is output. After a series of voltage conversion and output, the electrical signals turn into beautiful and wondrous music.

Moreover, turntables are also used to provide a fun and lively atmosphere on certain cheerful occasions such as public house (PUB), dance party, concert, etc. Disc jockeys (DJ) who play recorded music for an audience usually produce audio effects such as percussive or rhythmic sounds by adjusting rotation speed or direction of the turntable for keeping the atmosphere alive. However, conventional vinyl records are not only easily damaged by DJ scratching, a vast record collection is also required due to larger volume and less storage capacity. Thereby the vinyl records are inconvenient to carry or use. Thus a digital audio player such as digital vinyl system available no is provided with a simulated record for allowing DJ to operate and scratch like vinyl records. But there is no music information stored in the simulated record and the music is in fact played by computer software under control of the digital audio player. While the simulated record is either dragged to move slower or moved back in response to user's movements, signals related to rotation state of the simulated record are sent to the computer software to play corresponding music clips repetitively or create other sound effects.

Such type of record player has dual-axis design. As shown in FIG. 5, a chassis 6 is provided with a main rotating shaft 62 which is connected to and moved with a platter 61, and a second shaft 63 attached to the main rotating shaft 62 and capable of rotation together with or separated with the main rotating shaft 62. The second shaft 63 is connected to a simulated record C which rests on the platter 61 for synchronous rotation. A sensed member 64 is disposed on top of the second shaft 63 while a speed sensor 65 which is communicating with the sensed member 64 for detecting changes in rotation speed is arranged at a tonearm 7. When the simulated record C is moved by an external force, the simulated record C is rotated at the speed different from that of the platter 61 and the speed sensor 65 detects speed change for control of specific sound effects played. Although the above record player can play music with specific audio effects, such type of record player has the following shortcomings:

1. A turntable such as professional turntable for DJ is only for entertainment and unable to play vinyl records because that the tonearm is already used as the base frame for fixing the speed sensor.

2. The sensed member is disposed on the second shaft by a spanner. Or a component such as lock spring is arranged between the sensed member and the second shaft for assembly or disassembly of the sensed member with the second shaft.

3. The simulated record is connected to the second shaft by a spanner. Or a component such as lock spring is arranged between the simulated record and the second shaft for connection or disconnection of the simulated record with the second shaft.

4. When the second shaft 63 is rotating together with the main rotating shaft 62, a shaft locking member is required for synchronous rotation of both the second shaft 63 and the main rotating shaft 62.

5. The cost is high due to the dual-axis design and the device is not convenient to use. Recurrent assembly and disassembly cause wear and loosening which further lead to a decrease in sensing accuracy.

Thus there is room for improvement and there is a need to provide a bifunctional turntable which is more convenient to use.

SUMMARY OF THE INVENTION

Therefore, it is a prim ty object to provide a bifunctional turntable which plays not only vinyl records but also simulated records and thus more convenient to use.

In order to achieve the above object, a bifunctional turntable according to the present invention mainly includes a rotating shaft, a platter, a light sensor module, and an audio control module, all mounted in a plinth. The rotating shaft is driven to rotate by a power source drives the platter to rotate. The light sensor module disposed on the rotating shaft detects rotation speed of the platter for playing a record at normal speed. The audio control module is located in the plinth and disposed on a simulated record for detecting changes in the simulated record which is manually operated. Then the audio control module sends signals to a digital audio control system at a rear end for driving the digital audio control system to play music. The digital audio control system is a computer system for control of DJ software. Thereby the present turntable plays audio signals not only common records but also simulated records.

The audio control module is composed of a transducer and a sensor. The transducer is disposed on a central area of a simulated record and provided with a through hole which allows the rotating shaft to insert through. The sensor is mounted in the plinth and located under the platter for communicating with the transducer to generate control signals.

Preferably, the sensor is arranged at a stator of the power source which drives the rotating shaft to rotate and is used for communicating with the rotating transducer.

Preferably, the transducer is a magnetic transducer and the sensor is a Hall element.

Preferably, the transducer is covered by a protection case.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
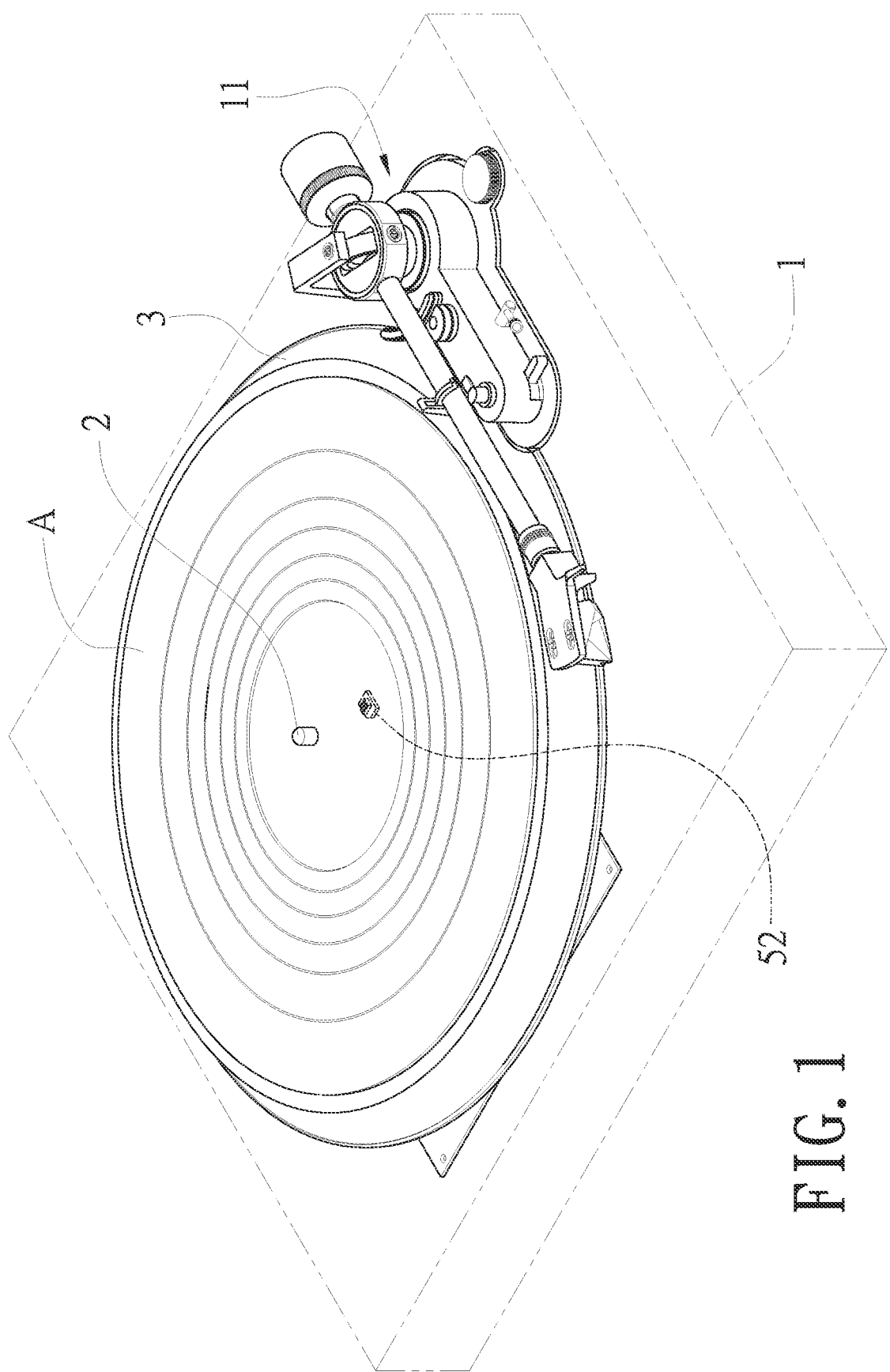
FIG. 1 is a perspective view of an embodiment according to the present invention.

In order to learn technical content, functions and features of the present invention more completely and clearly, please refer to the following embodiments together the related figures and reference numerals.

Refer to FIGS. 1-4, a bifunctional turntable according to the present invention mainly includes a plinth 1, a rotating shaft 2, a platter 3, a light sensor module 4, and an audio control module 5.

A moveable tonearm 11 is disposed on a surface of the plinth 1.

The rotating shaft 2 is arranged in the plinth 1 and driven to rotate by a power source 21.

The platter 3 is mounted to the rotating shaft 2 and located over a surface of the plinth 1 for loading a vinyl record. A or a simulated record B which is driven to rotate by the rotating shaft 2.

The light sensor module 4 is arranged on a bottom of the rotating shaft 2 for detecting rotation speed of the platter 3.

The audio control module 5 consists of a transducer 51 and a sensor 52. The transducer 51 is disposed on a central area of the simulated record B and provided with a through hole 511 which allows the rotating shaft 2 to insert through. The sensor 52 is mounted in the plinth 1 and located under the platter 3 for communicating with the transducer 51 correspondingly and outputting signals to a digital audio control system at a rear end to play music. The digital audio control system is a computer system for control of DJ software.

While in use, there are two embodiments of the present invention, as shown in FIGS. 1-4.

Figure 2:
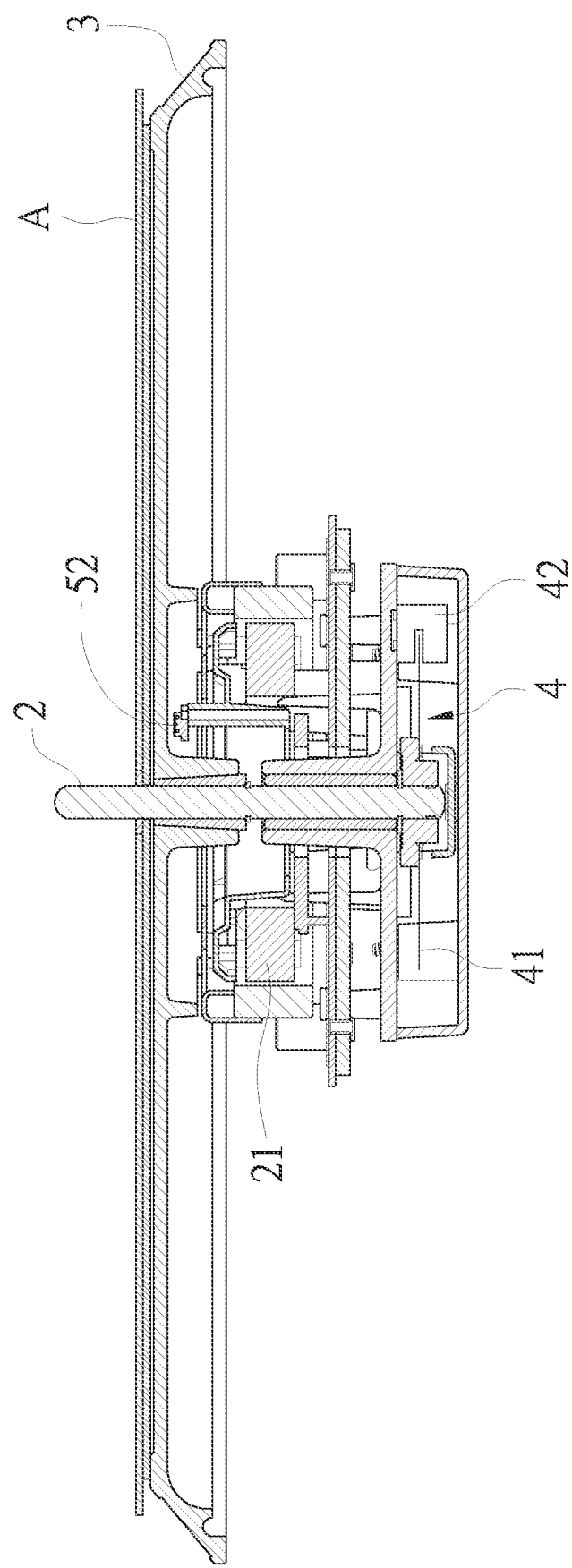
FIG. 2 is a sectional view of an embodiment according to the present invention.

A vinyl record A is played in embodiment one. Refer to FIG. 1 and FIG. 2, when users intend to play the vinyl record A, the vinyl record A is placed on the platter 3 over the plinth 1 and the rotating shaft 2 is driven to rotate by the power source 21 in the plinth 1. The power source 21 consists of a stator and a rotor which is mainly for the rotating shaft 2. Thereby the rotating shaft 2 further drives the platter 3 to rotate. After the vinyl record A being placed on the platter 3 and a start button being pressed, the platter 3 is driven to rotate and the tonearm 11 is manually operated to play the vinyl record A. During the playing of the vinyl record A, the rotation speed of the platter 3 is sensed and detected by the light sensor module 4 which includes a shade 41 and a light sensor 42. The shade 41 is disposed on the bottom of the rotating shaft 2 and the light sensor 42 is fixed on the plinth 1 for detecting rotation state of the shade 41. Thereby certain information such as the rotation speed, rotation direction, etc. of the vinyl record. A can be learned and related changes can be monitored in a real-time manner through the sensing and detection of the light sensor module 4. When all the music has been played or the user presses a stop button, the platter 3 stops rotating and the music stops immediately.

Figure 3:
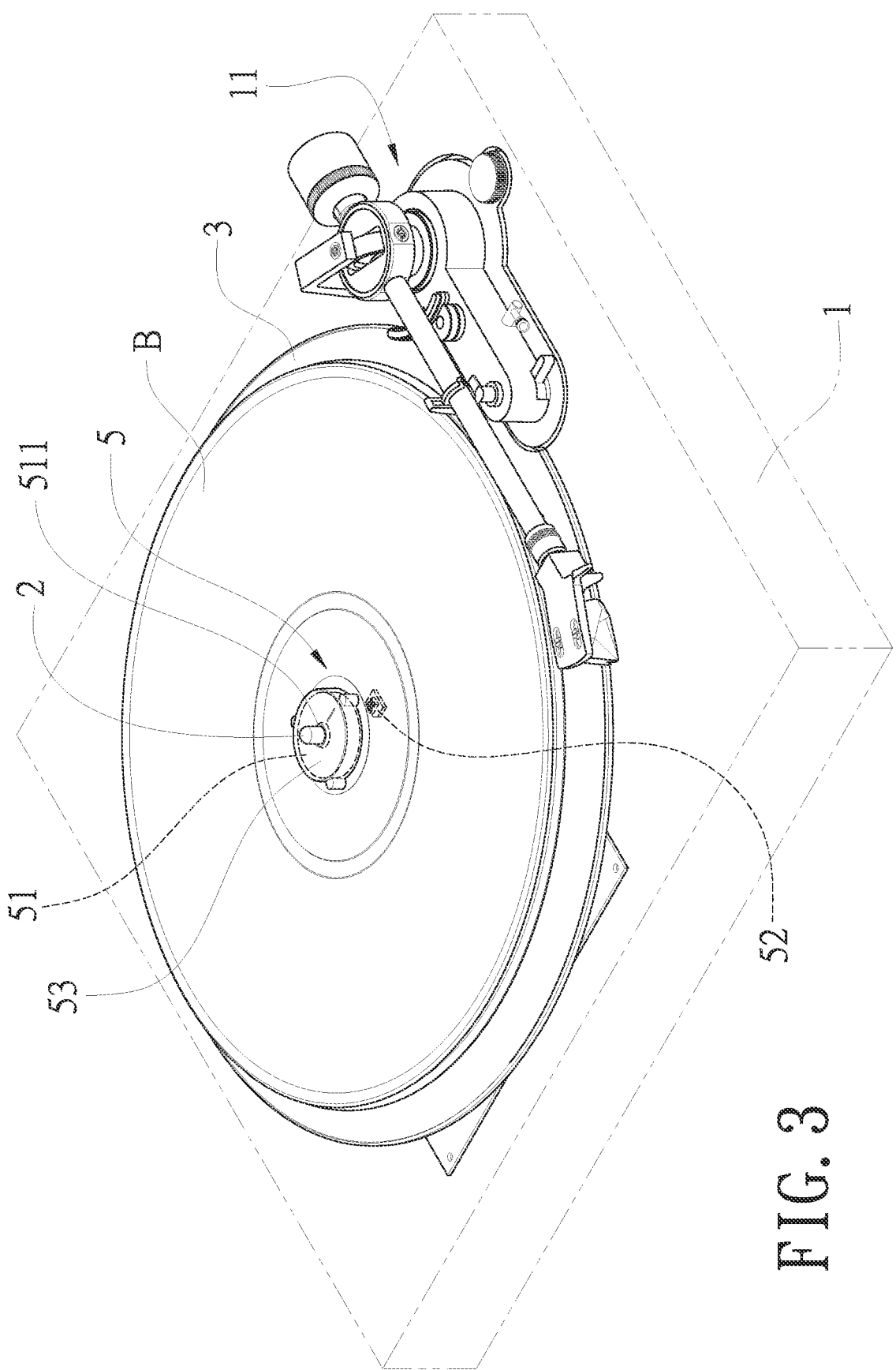
FIG. 3 is a perspective view of another embodiment according to the present invention.
Figure 4:
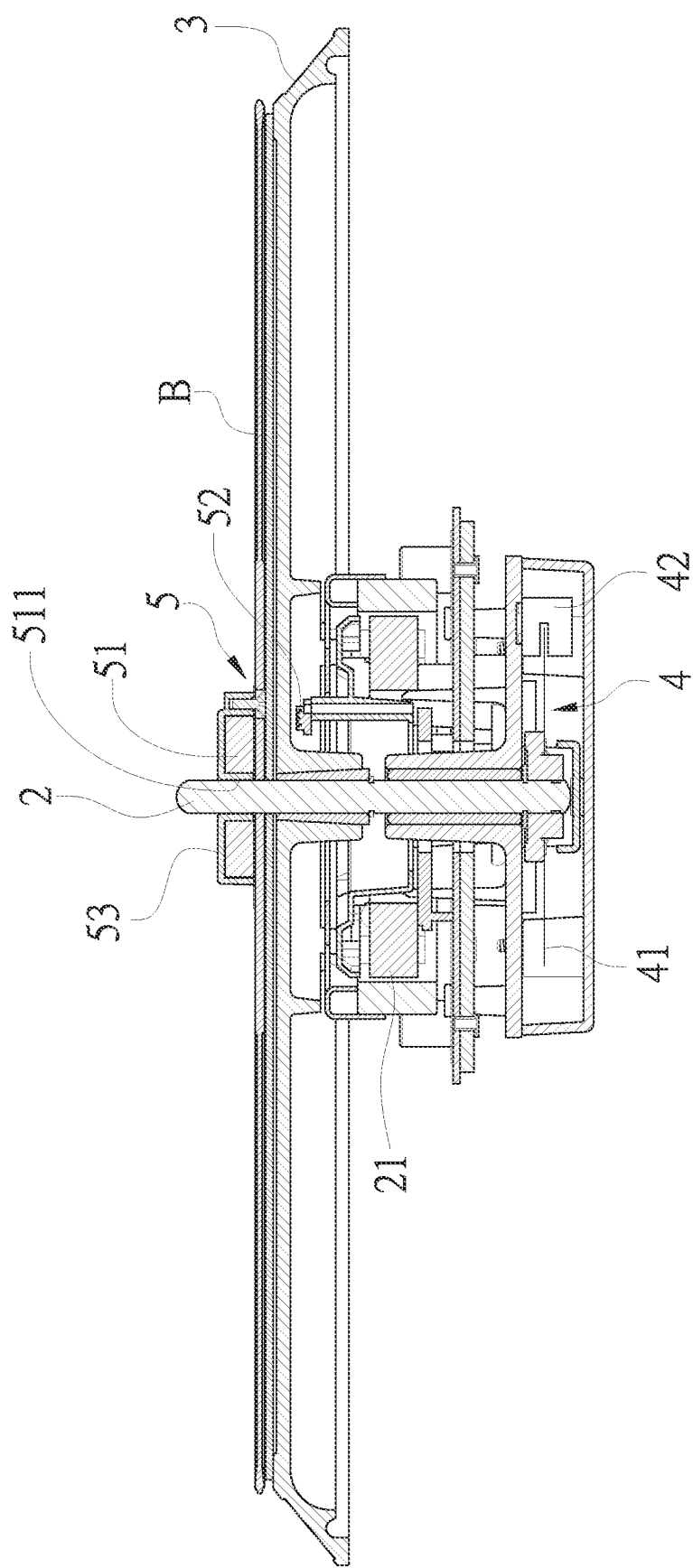
FIG. 4 is a sectional view of another embodiment according to the present invention.
Figure 5:
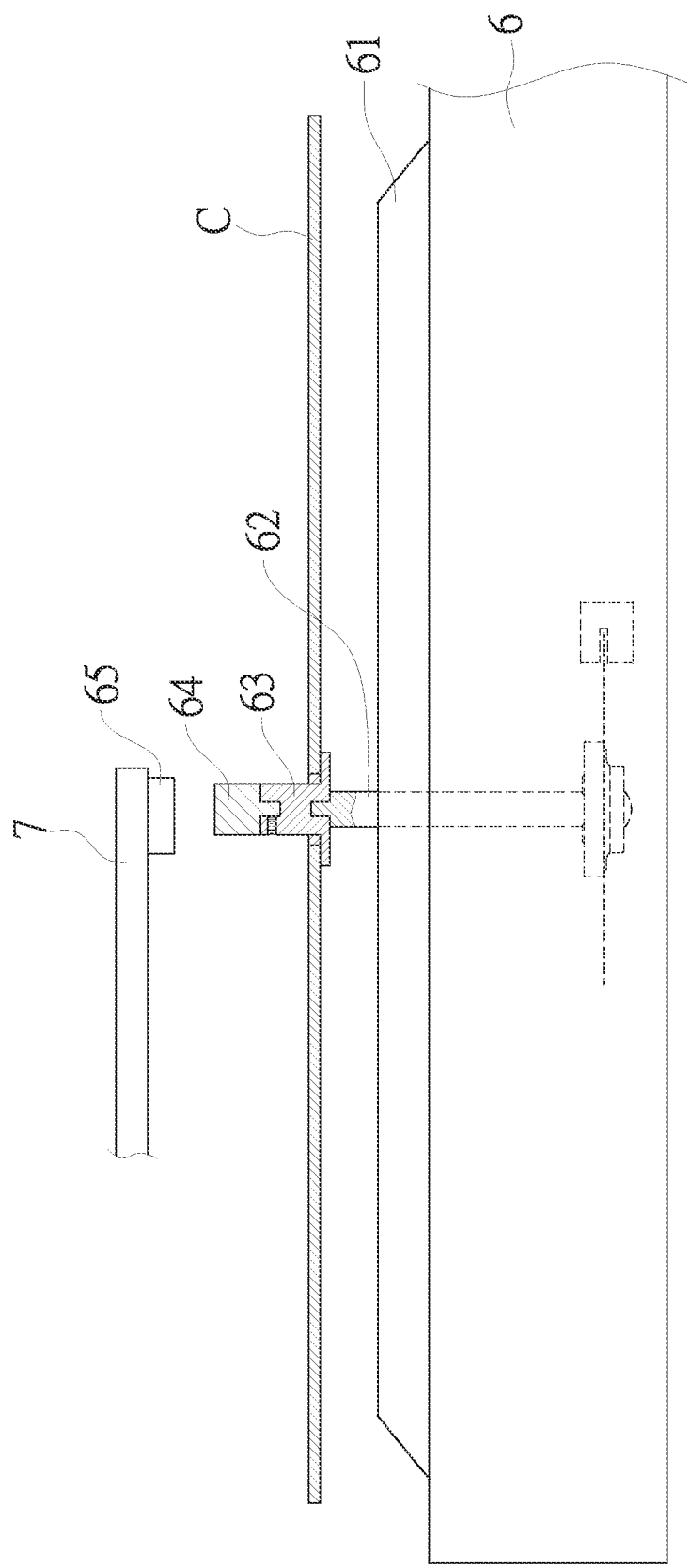
FIG. 5 is a sectional view of a prior art.

In the other embodiment, a simulated record B is played. As shown in FIG. 3 and FIG. 4, when the user would like to shift to the digital audio control system for playing a simulated record B in the fun and lively atmosphere, he/she only needs to replace the vinyl record A with the simulated record B and put the tonearm 11 back on its rest. A center of each simulated record B is provided with the transducer 51 which is mounted to the rotating shaft 2 by the through hole 511. The transducer 51 can be a magnetic transducer while a protection case is arranged outside the transducer 51 for covering the transducer Si and is fastened on the simulated record B. The sensor 52 is fixed in the plinth 1 and arranged at a fixed end (not rotated) just beside the rotating shaft 2 such as the stator or a rack of the power source 21, which drives the rotating shaft 2 to rotate, for communicating with the rotating transducer 51 and sending signals to a central processing unit in the plinth 1. The sensor 52 is a Hall element.

After being activated and the rotating shaft 2 starts rotating, information related to the vinyl record A such as the rotation speed and direction is learned by the light sensor 42. At the same time, the rotation speed or direction of the platter 3 or the rotating shaft 2 will not have changes while the user moves or stops the simulated record B on the on the platter 3. The sensor 52 detects changes in magnetic field of the rotating transducer 51 to generate audio control signals. Thereby corresponding changes in audio effects are played according to the audio control signals.

According to the above embodiments of the record player and the digital audio control system, the present device provides double functions to play either the vinyl record A or the simulated record B with fun and lively atmosphere.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A bifunctional turntable comprising:
   a plinth provided with a moveable to arm disposed on a surface thereof;
   a rotating shaft arranged in the plinth and driven to rotate by a power source;
   a platter mounted to the rotating shaft and located over a surface of the plinth for loading a vinyl or simulated record which is driven to rotate by the rotating shaft;
   a light sensor module which is arranged on a bottom of the rotating shaft for detecting rotation speed of the platter; and
   an audio control module having a transducer and a sensor; the transducer being disposed on a central area of the simulated record and provided with a through hole which allows the rotating shaft to insert through while the sensor being mounted in the plinth and located under the platter for communicating with the transducer correspondingly and outputting signals to a digital audio control system at a rear end to play music.

2. The bifunctional turntable as claimed in claim 1, wherein the sensor is arranged at a fixed end which is not rotated and located just beside the rotating shaft for communicating with the rotating transducer.

3. The bifunctional turntable as claimed in claim 2, wherein the transducer is covered by a protection case.

4. The bifunctional turntable as claimed in claim 2, wherein the transducer is a magnetic transducer and the sensor is a Hall element.

5. The bifunctional turntable as claimed in claim 1, wherein the transducer is a magnetic transducer and the sensor is a Hall element.

6. The bifunctional turntable as claimed in claim 1, wherein the transducer is covered by a protection case.

* * * * *